UNITED STATES PATENT OFFICE.

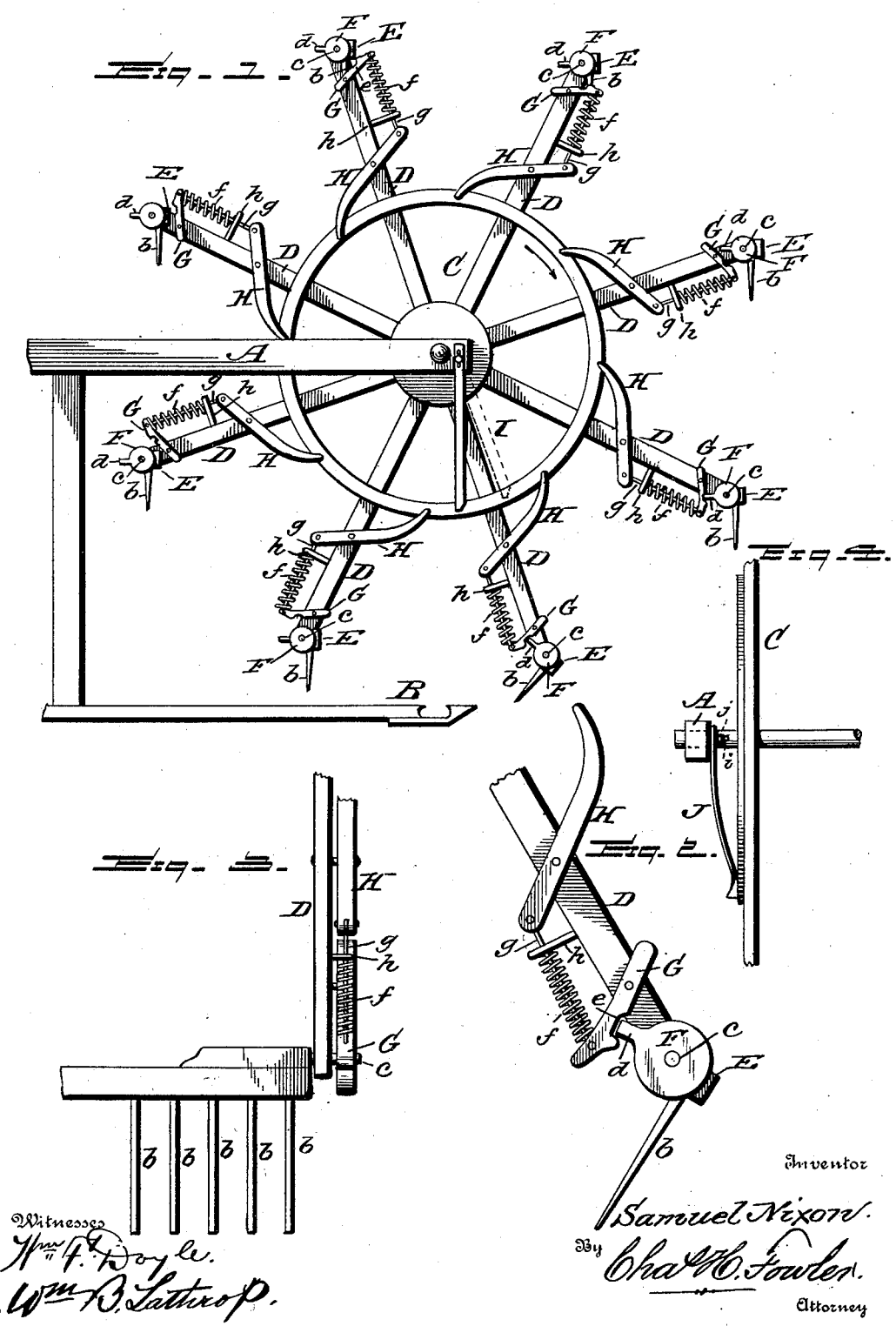

SAMUEL NIXON, OF CLYDE, WASHINGTON.

HARVESTER-REEL.

SPECIFICATION forming part of Letters Patent No. 671,707, dated April 9, 1901.

Application filed February 5, 1901. Serial No. 46,128. (No model.)

*To all whom it may concern:*

Be it known that I, SAMUEL NIXON, a citizen of the United States, residing at Clyde, in the county of Wallawalla and State of Washington, have invented certain new and useful Improvements in Harvester-Reels; and I do hereby declare that the following is a full, clear, and exact description of the same, reference being had to the annexed drawings, making a part of this specification, and to the letters of reference marked thereon.

The present invention has reference to that class of harvester-reels in which are employed automatically-operating tooth-bars to pick up the fallen-down grain, and as each bar in succession comes on line over or nearly over the sickle or cutter during the rotation of the reel said bar will be tripped and released to enable the teeth to freely pass over the grain without obstruction therefrom, and thus prevent the grain from being carried over beyond the point desired.

The invention consists in a rotatable harvester-reel constructed substantially as shown in the drawings and hereinafter described and claimed.

Figure 1 of the drawings is an end view of a rotatable harvester-reel constructed in accordance with my invention, the reel being shown as supported by horizontal arms over the sickle; Fig. 2, a side view of the outer end of one of the reel-arms, on an enlarged scale, showing the spring-actuated mechanism connecting therewith; Fig. 3, a front elevation of one of the ends of the tooth-bar and its connections; and Fig. 4, a detail view showing a modification of the trip device which operates the mechanism of the tooth-bar.

In the accompanying drawings, A represents one of two supporting-arms of a harvester, which are located directly over the sickle B, and between said arms and pivoted thereto is a rotatable reel C, of any preferred construction. The supporting-arms herein described may be variously modified or changed, or any suitable frame or support may be provided for the rotatable reel, this being left entirely to the judgment of the manufacturer.

The reel C is provided with any desirable number of radial arms D, to the outer ends of which are eccentrically pivoted the tooth-bars E, which are provided with the usual teeth $b$, as more clearly shown in Fig. 3 of the drawings. One of the pivot-pins $c$ of each tooth-bar E is provided with a suitable plate or disk F, with tooth $d$, the construction shown being preferable, although any suitable means connecting with the tooth-bar and movable therewith to engage the notched pivoted latch G may be substituted for the means shown without in any manner affecting the essential features of the invention. The latch G, which also may be of any preferred construction, is pivoted to the reel-arm D and has a notch $e$, with which engages the tooth $d$ to hold the rake-teeth in operative position. The latch G is spring-actuated in any desirable manner, but preferably by means of a coiled spring $f$, said latch being connected with a suitable arm H through the medium of a rod $g$. The rod $g$ extends through a guide-arm $h$, and around this rod is coiled the spring $f$, its ends bearing, respectively, against the latch and the guide-arm, as shown in Fig. 3 of the drawings.

The arm H is pivoted to the reel-arm D and is preferably curved at its free end; but any suitably-formed arm or connection may be used, as found most practical to insure a perfect operation of the trip mechanism herein described.

A trip device I is suitably connected to the arm A or to any part of the frame supporting the rotatable reel. This trip device may be in the form shown in Fig. 1 of the drawings or as shown at J in Fig. 4 of the drawings, as I do not wish to be understood as limiting my invention to any particular form or construction of trip device, as any means that will serve to release the latch by the action thereof upon the device may be used and still come within the general principle of the invention.

It should be understood that the tooth-bars E are eccentrically pivoted to the radial arms D, as shown in Fig. 3 of the drawings, and when the tooth-bars are not locked by the engagement of the notched latch G with the tooth $d$ of the disk or plate F the teeth $b$ will assume a vertical or upright position to correspond with the position of the tooth-bar, as shown in Fig. 1 of the drawings. This gravitating position of the tooth-bars is slightly changed as the reel revolves until the teeth are brought to a raking position, when the tooth $d$ of the plate F will automatically engage itself with the notch of the latch G and the teeth and bar held in a rigid position for action. As the end of the arm H comes in contact with the trip device I the latch G will be raised out of engagement with the tooth of the disk or plate F and the tooth-bar allowed to assume a gravitating position and hang loosely upon its pivotal connection until again automatically locked by the tooth $d$ engaging with the spring-actuated latch.

It is evident that many changes and modifications may be made in the details of construction without in any manner affecting the essential features of the invention, and any such changes as would come within ordinary mechanical skill and judgment may be resorted to and still retain the essential features of the invention.

As previously stated, the trip device may be of any desirable form and construction as found most preferable and may be connected to the supporting-arm of the harvester or any other part of the frame in such a manner as will admit of the trip device being capable of adjustment either back or forth at any desired angle to a perpendicular, so as to trip at the required point over the sickle. One of many means that may be used for adjustably connecting the trip device to the supporting-arm of the harvester-frame is the bolt $i$ and the nut $j$, which will secure the trip device to the arm and hold it in its adjusted position, the trip device being shown in full and dotted lines in two positions in Fig. 1 of the drawings, so that its adjustability is clearly indicated.

Having now fully described my invention, what I claim as new, and desire to secure by Letters Patent, is—

1. A harvester-reel and pivoted and gravitating tooth-bars connected therewith, a spring-actuated latch for holding the tooth-bar rigid, and a suitable trip device for releasing the latch from engagement with the tooth-bar, substantially as and for the purpose set forth.

2. A harvester-reel, a pivoted and gravitating tooth-bar connected therewith, a spring-actuated latch for holding the bar rigid, and an adjustable trip device for releasing the latch from engagement with the tooth-bar, substantially as and for the purpose described.

3. A harvester-reel, a pivoted gravitating tooth-bar connected therewith, a holding-tooth upon the end of the bar, a notched spring-actuated latch adapted to engage the tooth upon the end of the bar, and a trip device to release the latch and allow the tooth-bar to act by gravity, substantially as and for the purpose described.

4. A harvester-reel, a pivoted and gravitating tooth-bar connecting therewith, a spring actuated and pivoted latch adapted to engage the tooth-bar to hold it rigid, an arm connecting with the latch, and a suitable trip device for releasing the latch by contact with the arm, substantially as and for the purpose set forth.

In testimony that I claim the above I have hereunto subscribed my name in the presence of two witnesses

SAMUEL NIXON.

Witnesses:
WILLIAM H. DeVOE,
JAMES J. BRICE.